US008433237B2

(12) United States Patent
Lloyd

(10) Patent No.: US 8,433,237 B2
(45) Date of Patent: Apr. 30, 2013

(54) ASSESSABLE NATURAL INTERACTIONS IN FORMAL COURSE CURRICULUMS

(75) Inventor: Clifford Huw Lloyd, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 12/484,927

(22) Filed: Jun. 15, 2009

(65) Prior Publication Data

US 2010/0316985 A1    Dec. 16, 2010

(51) Int. Cl.
*G09B 5/00*       (2006.01)
(52) U.S. Cl.
USPC ................... 434/362; 434/307 R; 434/353
(58) Field of Classification Search ............. 434/322, 434/350, 362, 323
See application file for complete search history.

(56) References Cited

U.S. PATENT DOCUMENTS

| | | | | |
|---|---|---|---|---|
| 5,658,161 | A  * | 8/1997 | Roberts et al. | 434/353 |
| 5,978,648 | A  * | 11/1999 | George et al. | 434/362 |
| 6,029,043 | A  * | 2/2000 | Ho et al. | 434/350 |
| 6,704,541 | B1 * | 3/2004 | Ciarallo et al. | 434/362 |
| 6,915,104 | B2 * | 7/2005 | Yonezu et al. | 434/350 |
| 7,300,287 | B2 | 11/2007 | Dowdell et al. | |
| 2003/0228563 | A1* | 12/2003 | Sang et al. | 434/323 |
| 2005/0287510 | A1* | 12/2005 | Sumrall et al. | 434/353 |
| 2006/0242004 | A1 | 10/2006 | Yaskin | |
| 2007/0082324 | A1* | 4/2007 | Johnson et al. | 434/156 |
| 2008/0140401 | A1* | 6/2008 | Abrash et al. | 434/185 |
| 2008/0176194 | A1* | 7/2008 | Zolt et al. | 434/178 |
| 2009/0098524 | A1* | 4/2009 | Walton | 434/350 |

OTHER PUBLICATIONS

American Public University System, APUS Faculty Professional Development Opportunities, Jul. 5, 2007, pp. 1-5.
Kentucky Community and Technical College System, Assessment rubric for AHS 201 discussion board postings, retrieved May 2009 from http://ie.westkentucky.kctcs.edu/rubrics/ahs201.doc, pp. 1-3.
Monaco, T., CUIN 7352: Curriculum and management system for gifted and talented students, University of Houston, retrieved May 2009 from http://www.uh.edu/~tmonaco/7352.htm, pp. 1-7.
Steele, F. J., Enhanced syllabus for english 211: Understanding english grammar, retrieved May 2009 from http://steele.intrasun.tcnj.edu/curriculum/enhance_211.doc, pp. 1-6.

(Continued)

*Primary Examiner* — Kathleen Mosser
(74) *Attorney, Agent, or Firm* — Microsoft Corporation

(57) ABSTRACT

A natural interactions academic course designer system and method that allows an educator to integrate a natural interactions forum (such as discussion boards, blogs, and collaborative wikis) into a formal curriculum. Embodiments of the system and method include a natural interactions integration module, which allows an educator to select a type of natural interaction forum and attaches a rubric, and a natural interactions provisioning module that creates the forum, determines the participants, and the learners to be assessed. Embodiments of the system and method also include an assessment module that assesses a validated learner using one or more of three different metrics. These metrics include a participation metric, a tagging metric, and a natural language processing metric. The assessment module then creates a raw score from the metrics used. Embodiments of the system and method also include a learner tracking module that generates a single final score for the assignment.

25 Claims, 5 Drawing Sheets

OTHER PUBLICATIONS

Blackboard Inc., Grade Center, retrieved May 2009 from http://library.blackboard.com/ref/36ba3329-e441-488a-93ce-7a55543cc999/Content/Grade%20Center/Grade%20Center%20Overview.htm, pp. 1-72.

TLE instructor guide, retrieved May 2009 from http://www.brookscole.com/math_d/special_features/ext/TLE/front_porch/TLE_Instructor_Guide.pdf, pp. 1-52.

Bawden, D., L. Robinson, T. Anderson, J. Bates, U. Rutkauskiene, P. Vilar, Towards curriculum 2.0: Library / information education for a Web 2.0 world, vol. 31, No. 99, Oct. 2007, pp. 14-25.

North American Council for Online Learning, Bridging the gap through online learning, Virtual School Symposium, http://2008.virtualschoolsymposium.org/exhibitors.php, Oct. 2008, pp. 1-8.

* cited by examiner

ASSESSABLE NATURAL INTERACTIONS IN FORMAL COURSE CURRICULUMS

BACKGROUND

One of the principal interactions between an educator and a learner (or student) is the creation of a course, the assignment of tasks and activities related to learning, and the assessment of a learner's response to those tasks and activities. A fundamental function of the educator is to assess a learner's competency or understanding of a given topic. Typically, an educator will do this by setting an assignment that has goals and objectives associated with that assignment. The learner then executes that assignment within a given time frame and the educator then assesses the learner's response. This assessment helps the educator to form a judgment as to how well the learner understands a particular concept or topic.

Traditionally, there are two forms of assessment that an educator uses: (1) subjective assessment; and (2) non-subjective assessment. The non-subjective form as assessment generally manifest itself as a quiz having true or false answers or single word responses. There is no subjectivity regarding the given responses, and the responses are either right or wrong.

The second type of assessment that an educator often will use is called subjective assessment. The subjective form of assessment generally manifests itself in the form of an essay. The subjective assessment contains a great deal of opinion and other subjectivity as to what the learner has expressed and how the educator defines from what the learner has presented in the essay whether or not the learner has understood the topic.

Regarding the non-subjective type of assessment, one challenge is that the nature of quizzes is such that a student can obtain a decent score without really knowing the topic. In other words, the learner can simply guess and still obtain a relatively average score without really understanding the topic. Thus, the score is as much as factor of a learner's understanding of the topic as it is a factor of random chance.

As assessment results (such as grades), however, are becoming increasingly more valuable in today's competitive world, the pressure is on educators for assessment results to be accurate. Because of this pressure, educators increasingly are relying on the subjective form of assessment. Random chance is virtually eliminated with the subjective form of assessment.

There are two challenges associated with the subjective form of assessment. One challenge is that the grading burden on the educator can be enormous. Imagine a professor who has a class of two-hundred students who have each just turned in a ten-page essay on a particular topic. The grading burden on that professor to grade these essays is enormous. Frequently this burden is offset by giving the grading task to multiple teaching assistants. However, this then introduces inconsistency into the assessment results. In other words, there often is different subjectivity depending on who is performing the grading task. This reduces the confidence in the subjective form of assessment because of the potential for grading inequalities.

The second challenge associated with the subjective form of assessment is getting the learner to actually perform the task or assignment. The attention span of learners today is highly conditioned by the social networking community and the Web 2.0 features. Learners today are involved in online discussions, blogs, wikis, and chat rooms. The idea of exiting that world and writing a ten-page essay in a word processing program is somewhat disconcerting to today's learners.

Today's learners are involved in natural interactions. A natural interaction is defined as a machine-facilitated communication and interaction between human beings that is part of a person's natural desire to communicate with others. This is in contrast to tasks that a person is required to do. Examples of natural interactions include social networking, social computing, making use of Web 2.0 features, discussion boards, blogs, and collaborative wikis, to name a few. Each person has a natural desire to communicate with others, to express our views, and to hear other's views. On the other hand, it is not a natural instinct to want to write essays. The learner simply does the essay in order do it to pass a course. In addition, natural interaction is done on personal device of the learner, such as a learner's smart phone. The learner chooses to use the device, and in fact is using the device multiple times per day already.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the natural interactions academic course designer system and method bring are an academic course designer tool that allows an educator to plan natural interactions of today's learners (such as discussion boards, blogs, and collaborative wikis) into their syllabus and curriculum. This is done in the same way as the educator uses to plan for a quiz or an essay. Embodiments of the system and method allow an educator to blend together the natural interaction forums that are a major part of a learner's life and the formal curriculum for a course that are required by institutions (such as universities).

Embodiments of the natural interactions academic course designer system and method are based on the fact that accurate assessment vehicles that allow an educator to really understand the depth of understanding of student are highly desirable. Moreover, it is understood that there is too much random chance with the non-subjective form of assessment to make this form of assessment accurate. Embodiments of the system and method use the subjective form of assessment (in the form of a natural interaction forum) to assess a learner's understanding of a particular topic.

Embodiments of the natural interactions academic course designer system and method provide consistent and fair assessment of a learner's knowledge while engaging the learner in a type of natural interaction forum that the learner is already using anyway. In particular, the learner is already spending their time on social networking, chat rooms, collaborative wikis, and blogging. Learners are already interacting instinctively with each other electronically. Because the electronic interaction uses a machine that sits between the participants of the interaction, embodiments of the system and method have a way of interpreting, analyzing, and examining the data flowing between the natural interaction forum.

At the highest level, embodiments of the natural interactions academic course designer system and method harness the natural interactions that are going on anyway between learners, and creates a mechanism whereby the educator can formalize those interactions that are taking place anyway with a view to being able to use the interactions as a viable subjective assessment tool. Embodiments of the system and method also allow an educator to perform meaningful assessment of a learner's understanding of a topic over the top of a natural interactions forum. An educator who is spending a great deal of time grading work that a learner never really wanted to do in the first place can use embodiments of the system and method to assign a task that the learner wants to do and is doing already. This is truly a win-win situation for the educator and the learner. The educator is putting in less time and achieving a more accurate assessment of a learner's knowledge, while the learner is learning and being assessed in a way that the learner is quite familiar and proficient and is already doing anyway.

Embodiments of the natural interactions academic course designer system and method include a natural interactions integration module and a natural interactions provisioning module. The natural interactions integration module allows an educator to select a type of natural interaction forum to use in assessing the learners. In addition, the natural interactions module attaches a rubric to the selected natural interactions forum to aid in assessing the learner's performance on the natural interaction assignment. Once a natural interaction forum is selected, the natural interactions provisioning module creates the forum and uses tools in order to determine who will participate and who the system will assess. This improves grading efficiency and accuracy by only scoring those learners who are registered in the class and who were given the assignment.

Embodiments of the natural interactions academic course designer system and method also include an assessment module and a learner tracking module. The assessment module performs an assessment for a validated learner. The assessment is performed using one or more of three different metrics. A first metric is a participation metric, which measures both statistically and visually the participation of the learner in the natural interactions forum. A second metric is a tagging metric, which assigns tags to each post of a learner matching the post back to a topic in the rubric. A third metric is a natural language processing metric that uses one or more natural language processing techniques to match language in a learner's post to topics and keywords contained in the rubric. The assessment module then creates a raw score from the metrics used.

The learner tracking module normalizes the raw score and generates a single final score or grade for the natural interactions assignment. This final grade for the assignment then is integrated into the formal gradebook for the course alongside other natural interaction assignments and formal assessment techniques (such as essays).

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the natural interactions academic course designer system and method reference is made to the accompanying drawings, which form a part thereof, and in which is shown by way of illustration a specific example whereby embodiments of the natural interactions academic course designer system and method may be practiced. It is to be understood that other embodiments may be utilized and structural changes may be made without departing from the scope of the claimed subject matter.

I. System Overview

Embodiments of the natural interactions academic course designer system and method bridge two disparate worlds. The first world is the formalized learning curriculum and teaching process of an institution (such as a school). In general, this formal academic courseware process includes the construction of a curriculum, where the curriculum is a structured taxonomy of the course. The curriculum typically is broken into academic periods (such as semesters or terms). In addition, there are a series of goals and objectives to be delivered at a macroscopic level for each academic period.

Moreover, the academic period will typically be broken into units of learning. Each unit of learning typically is further divided into types of learning opportunities. In other words, the unit will be broken down into instances where the educator is teaching something, and the learning opportunities will be broken down into assessment opportunities. These assessment opportunities are planned activities that allow the educator to pause and take stock of what a learner has learned. For example, a learning unit may be composed of three lectures per week and a weekly quiz at the end of those three lectures. This formal learning process is published to the learner as a syllabus.

A second world is the collaborative machine-based space in which many of today's learners are quite familiar. This space is handled by many different social networking and collaborative websites. These websites and machines allow natural interactions between people. For example, it is quite commonplace for today's learner to maintain a blog, participate in online social networking, and be active in several discussion boards all from their mobile smartphone.

Embodiments of the natural interactions academic course designer system and method bring the two worlds together. Formal courseware is maintained and the natural interactions of the learner's informal world are added to the formal curriculum. Moreover, embodiments of the natural interactions academic course designer system and method facilitate assessment of these natural interactions and integration of the assessment as part of the formal grading process.

Figure 1:
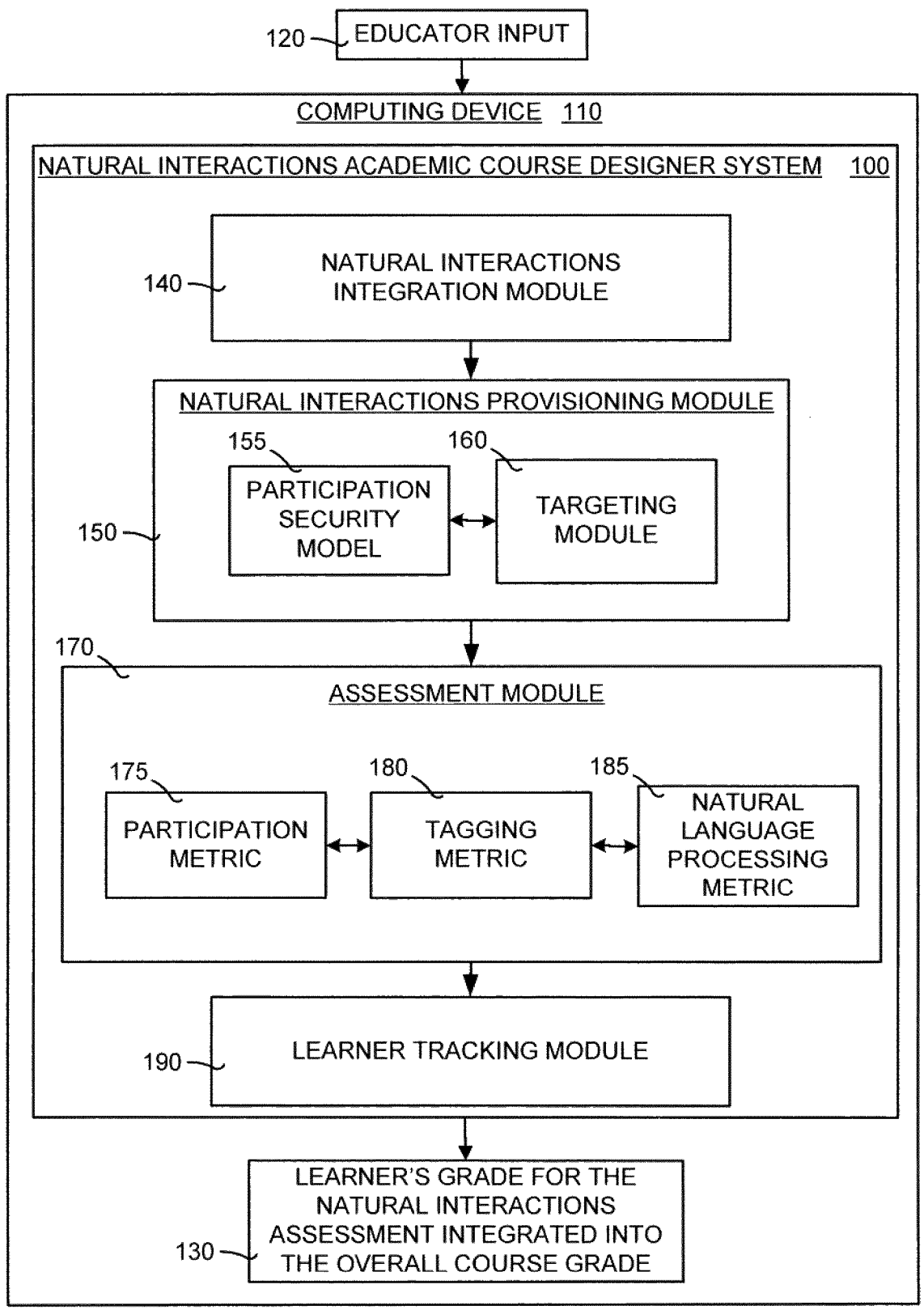
FIG. 1 is a block diagram illustrating a general overview of embodiments of the natural interactions academic course designer system and method implemented on a computing device.

FIG. 1 is a block diagram illustrating a general overview of embodiments of the natural interactions academic course designer system 100 and method implemented on a computing device 110. In general, embodiments of the natural interactions academic course designer system 100 shown in FIG. 1 receive educator input 120, processes the input from the educator to facilitate assessment of a learner's ability using natural interactions, and outputs a learner's grade for the natural interactions assessment that has been integrated into the learner's overall course grade 130.

More specifically, embodiments of the natural interactions academic course designer system 100 include a natural interactions integration module 140. The natural interactions integration module 140 allows the educator to select a type of natural interaction that the educator would like to use. For example, the educator may select a discussion board as the type of natural interaction to be used in assessing the learner's knowledge.

Embodiments of the natural interactions academic course designer system 100 also include a natural interactions provisioning module 150. The natural interactions provisioning module creates the selected natural interaction such that only those learner's that have been assigned the assignment are included in the assessment. This module 150 also includes a participation security model 155 and a targeting module 160. The participation security model 155 allows only those learners that are registered for the course and who have been assigned the assignment to participate in the selected natural interaction (such as a discussion board). If participation cannot be limited to those learners that were assigned the assignment, then the targeting module 160 parses out those learners assigned the assignment such that the remained of participants are ignored. In other words, only those learners that were given the assignment are assessed by the system 100.

Embodiments of the natural interactions academic course designer system 100 also include an assessment module 170. The assessment module 170 examines the posts of the selected natural interaction to provide as assessment of how well the learner understands the topic. The assessment module 170 includes a participation metric 175, a tagging metric 180, and a natural language processing metric 185. The participation metric 175 measures and provides visualization of each learner's participation in the selected natural interaction. The tagging metric 180 facilitates either automatic or manual tagging of posts based on the rubric. The natural language processing metric 185 allows natural language processing techniques to be used to find specific key words and phrases to indicate the level of understanding of the learner.

Embodiments of the natural interactions academic course designer system 100 also include a learner tracking module 190. The learner tracking module 190 facilitates the computing of a single score (or grade) for the selected natural interaction assignment. In addition, the learner tracking module 190 integrates the score for the selected natural interaction assignment into the formal gradebook of the corresponding learner.

II. Operational Overview

Figure 2:
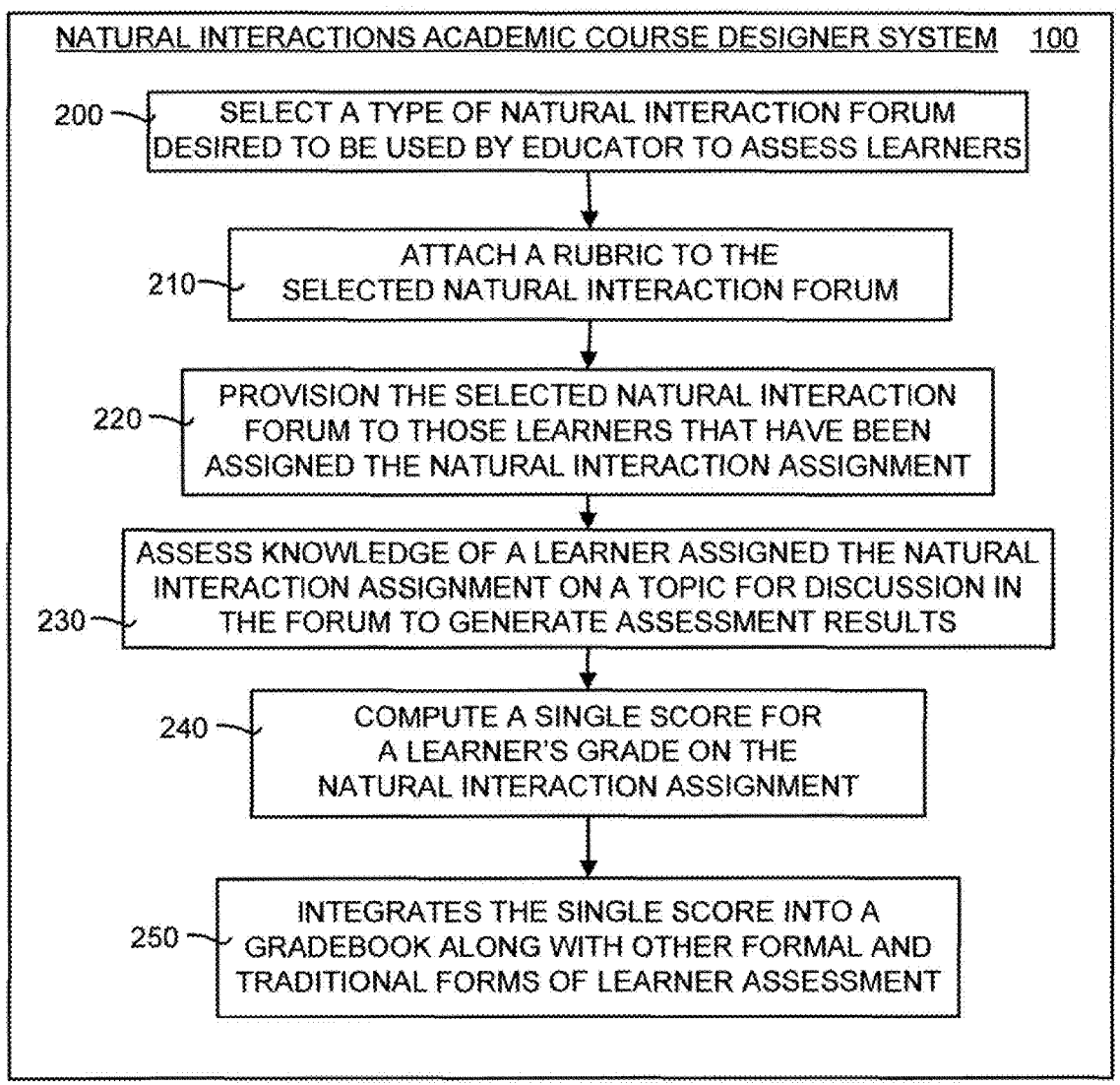
FIG. 2 is a flow diagram illustrating the general operation of embodiments of the natural interactions academic course designer system shown in FIG. 1.

FIG. 2 is a flow diagram illustrating the general operation of embodiments of the natural interactions academic course designer system 100 shown in FIG. 1. Referring to FIG. 2, the method begins by having the educator select a type of natural interaction forum that the educator would like to use in assessing the learners in the educator's class (box 200). The types of natural interaction forums include, but are not limited to, discussion boards, collaborative wikis, blogs, and chat forums.

Once a type of natural interaction has been selected by the educator, then a rubric is attached to the selected natural interaction forum (box 210). The rubric is a modality that is used to measure how well a learner performed on the assessment. A rubric is a template or benchmark that an educator can use to assess the results of a learner's responses. A rubric can be a spreadsheet, where the rows of the spreadsheet are a list of goal statements and the columns of the spreadsheet describe the different grades that are possible to be achieved against each of the goals or objectives. The intersection point of the row and column is a descriptive element that describes the type of demonstration a learner needs to have given to be awarded that grade.

Next, the method provisions the selected natural interaction to those learners that have been assigned the natural interaction assignment (box 220). This means that the system 100 generates the type of natural interaction selected by the educator and ensures that only those learners that have the assignment are assessed. As discussed in detail below, there are a couple ways in which the system 100 achieves this objective.

The method then assesses the knowledge of a learner of a topic that is being discussed in the selected natural interaction forum (box 230). It should be noted that the learner has been assigned the natural interaction assignment. This assessment generates assessment results for the particular learner. The system 100 uses one or more of a variety of techniques to perform this assessment. Each of these assessment techniques is described in detail below.

Once the learners have been assessed, the method then computes a single score for each learner (box 240). In general, this single score is the learner's grade on the natural interaction assignment. The method then integrates the single score into a formal gradebook for that particular learner (box 250). The score on the natural interaction assignment is integrated into the formal gradebook along with other formal and traditional forms of learner assessment. For example, the learner's final course grade may be a combination of grades on multiple natural interaction assignments and more formal and traditional forms of assessment such as a written essay.

III. Operational Details

The operational details of embodiments of the natural interactions academic course designer system 100 and method now will be discussed. These embodiments include embodiments of the natural interactions integration module 140, the natural interactions provisioning module 150, the assessment module 170, and the learner tracking module 190. The operational details of each of these programs modules now will be discussed in detail.

III.A. Natural Interactions Integration Module

Embodiments of the natural interactions integration module 140 allow an educator to select the type of natural interaction that they want to support. In other words, the educator can define a blog, a discussion board, or a collaborative wiki, as an assignment on which the learner will be graded. The educator can then attaches specific goals and objectives to the particular selected natural interaction or discussion. Embodiments of the module 140 allow the educator to follows a formal course outline and yet still assign an informal activity (such as some form of electronic communication or collaboration) for assessment and inclusion in the learner's final grade.

Embodiments of the natural interactions integration module 140 also give the educator the ability to attach goals and objectives to the selected natural interaction assignment. In some embodiments, these goals and objectives are attached in the form of a rubric. As noted above, a rubric is a template or benchmark that tells an educator how to assess the results of a learner's responses. The rubric gives the system 100 a template for understanding what a learner should demonstrate in order to be awarded a particular score or grade.

III.B. Natural Interactions Provisioning Module

Embodiments of the natural interactions provisioning module 150 create the actual natural interaction forum that will used to assess the learners. Now that the system 100 has planned for the natural interactions and built them into the syllabus and courseware, embodiments of the natural interactions provisioning module 150 create and dynamically build the natural interaction forum. Moreover, embodiments of the natural interactions provisioning module 150 also ensure that the correct learner are assessed.

Figure 3:
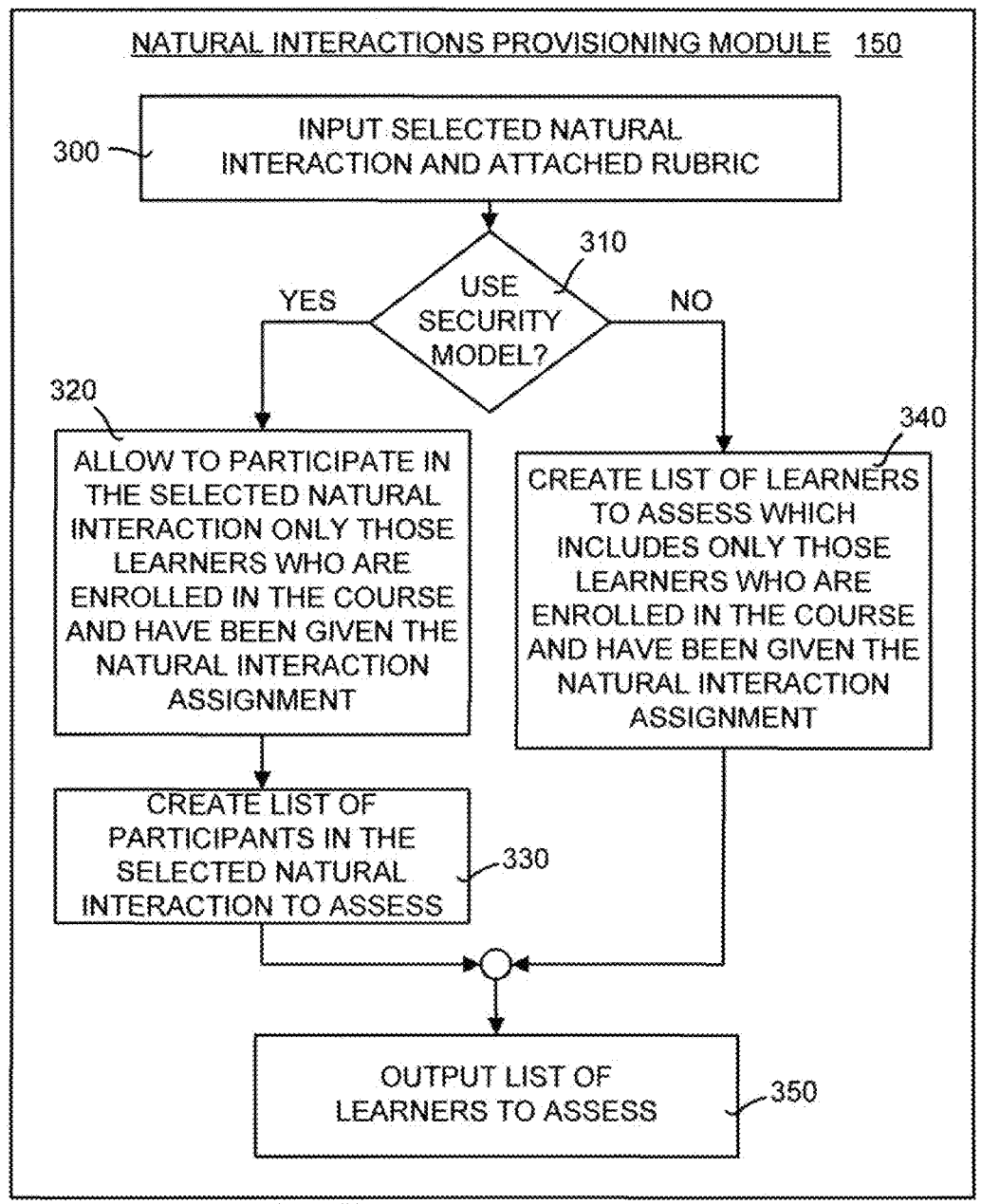
FIG. 3 is a flow diagram illustrating the detailed operation of embodiments of the natural interactions provisioning module shown in FIG. 1.

FIG. 3 is a flow diagram illustrating the detailed operation of embodiments of the natural interactions provisioning module 150 shown in FIG. 1. The module 150 begins by input the selected natural interaction forum and the rubric that is attached to the forum (box 300). Next, a determination is made as to whether a security model will be used (box 310). If a security model is used, then the module 150 allows participation in the natural interaction forum those learners who are enrolled in the course and who have been given the assignment (box 320).

One problem with a natural interaction forum is that it is that it is typically a free-for-all. In other words, anyone can participant. However, the educator only wants to assess and track those learners who have had the task assigned to them. Using the security model and the knowledge of which learners are enrolled in a given course mitigates this free-for-all problem. In particular, using the security model, the module 150 only allows those learners to participate in the natural interaction forum who are registered in the course and have been given the assignment (box 320). By only allowing those learners who are registered in the course and who have been assigned the given task, others participants are locked out of the forum. The module 150 then creates a list of participants in the natural interaction forum that are to be assessed (box 330).

In some cases, however, people who are not assigned the natural interactions assignment cannot be kept out of the discussion board. In this situation, the security model is not used since outsiders cannot be kept out. Moreover, there may be times when the educator wants other participants in the forum. However, the educator wants the system 100 to assess only those learners who have been assigned the task.

In this situation, the module 150 has a list of who is registered in the course and who of those registered has been assigned the task. The module 150 then will create a list of learners to assess which includes only those learners who are enrolled in the course and who have been given the natural interaction assignment (box 340). The output of the module 150 is a list of learners to assess (box 350).

III.C. Assessment Module

The challenge now for the educator is to confront the assigned natural interaction forum having numerous posts and assigning a score to each learner. In other words, how does the educator score each particular person who has contributed to the forum. In general, the assessment module 170 assists the educator in assessing how well a particular learner understands a particular topic by using the associated rubric and one or more metrics. Namely, these metrics are the participation metric, the tagging metric, and the natural language process (NLP) metric.

Figure 4:
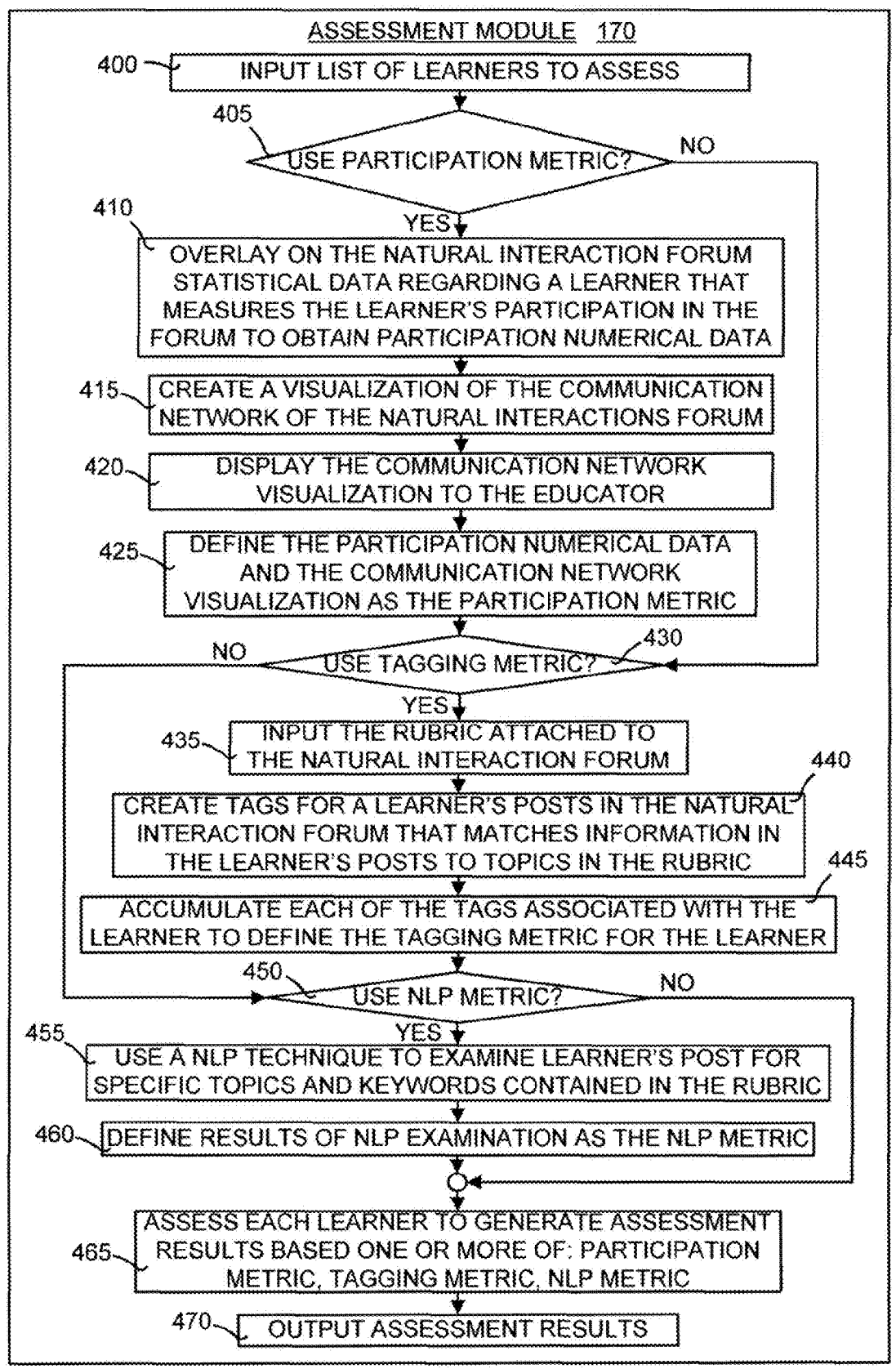
FIG. 4 is a flow diagram illustrating the detailed operation of embodiments of the assessment module shown in FIG. 1.

FIG. 4 is a flow diagram illustrating the detailed operation of embodiments of the assessment module 170 shown in FIG. 1. The method begins by inputting the list of learners to assess (box 400). A determination then is made as to whether to use a participation metric (box 405). The participation metric includes a physical number that is a measure of learner participation and a visualization of the communication network of the natural interaction forum. The system 100 allows an educator seed the natural interaction forum with a topic for discussion. For example, if the natural interaction forum is a discussion board then the educator may start the discussion with a question or topic that is up for discussion. Each of the learners (and sometimes other participants) then posts one or more responses to this initial question. In addition, additional question may be asked that further the topic discussion.

If the participation metric will be used, then the module 170 creates an overlay on the natural interaction forum containing statistical data (box 410). This statistical data pertains to a learner and measures the learners' participation in the form. Participation numerical data is obtained from this overlay. The statistical data obtained includes items such as a number of posts by the learner, the number of times the learner started a thread, the number of times the learner ended a thread, the number of times the learner had someone respond to their post, the number of times the learner responded to another participant's post, and the complexity of the post. One or more of these items of data are includes in the participation numerical data for a learner.

As part of the participation metric, the module also creates a visualization of a communication network of the natural interaction forum (box 415). This communication network visualization then is displayed to the educator (box 420). In some embodiments of the module 170, each learner is represented in the communication network visualization as a disk or circle, and the size of the disk represents a level of activity of a learner. An intersecting line between disks represents the networks of communication that have occurred in the natural interaction forum.

The module 170 then defines the participation metric as some combination of the participation numerical data and the communication network visualization (box 425). Both the statistical and visualization aspects of the participation metric give the educator an insight into the flow of discussions that took place in the forum. The educator is able to see the depth of discussion, the level of engagement, and the overall level of participation for each learner.

A determination then is made as to whether to use a tagging metric (box 430). Tagging comes back to the fact that the natural interaction forum has an attached rubric, which is input to the module 170 (box 435). Next, the module 170 creates tags for a learner's posts in the forum (box 440). These tags match information in the learner's posts to topics and other information in the rubric. In other words, the module 170 essentially turns the rubric into tags. The module 170 goes through the forum and matches individual posts to topics within the rubric. In some embodiments, this process is automatic. In other embodiments, the tagging process is performed manually by having the educator right click with a pointing device on the post and attaching a tag corresponding to a rubric statement. For example, if a statement made in a post is indicative of an understanding of a portion of the topic being tested, the educator can mark the post with a tag indicating the rubric statement associated with an understanding of that portion of the topic.

At the end of the grading session, the module 170 accumulates each of the tags that have been attributed to each learner to define the tagging metric for the learner (box 445). In essence, the tagging metric is a summary of how each learner demonstrated their knowledge against the rubric. This allows the module 170 to plug back into the rubric a score for each learner against each one of the topics.

A determination then is made as to whether to use a natural language processing (NLP) metric (box 450). If NLP will be used, then a NLP technique is used to examiner a learner's posts for specific topics and keywords contained in the rubric (box 455). The results of the NLP examination then are defined as the natural language metric (box 460).

The module then assesses each learner to generate assessment results for a particular learner (box 465). Depending on the metrics used, these assessment results can be based on one or more of the participation metric, the tagging metric, and the natural language processing metric. The output of the module 170 is the assessment results (box 470).

III.D. Learner Tracking Module

Embodiments of the learner tracking module 190 normalizes the assessment results into an overall score or grade for the learner for the natural interaction assignment. The learner tracking module 190 then incorporates this grade for the assignment into the formal gradebook for the course. Thus, the learner tracking module 190 allows the integration of the score or grade from the natural interaction forum into the gradebook along with grades and scores for the more formal assessment methods (such as essays).

IV. Exemplary Operating Environment

Embodiments of the natural interactions academic course designer system 100 and method are designed to operate in a computing environment. The following discussion is intended to provide a brief, general description of a suitable computing environment in which embodiments of the natural interactions academic course designer system 100 and method may be implemented.

Figure 5:
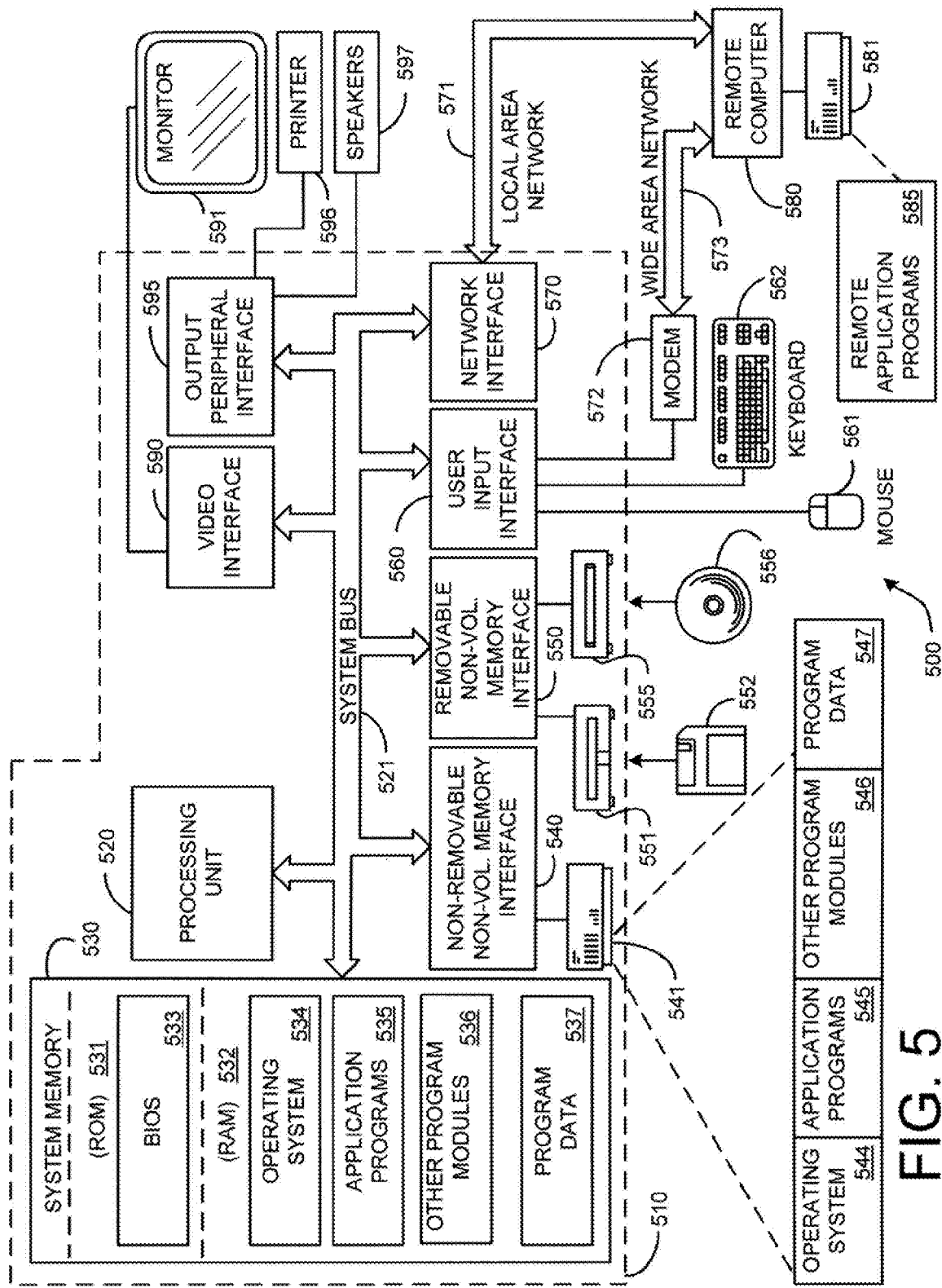
FIG. 5 illustrates an example of a suitable computing system environment in which embodiments of the natural interactions academic course designer system and method shown in FIGS. 1-4 may be implemented.

FIG. 5 illustrates an example of a suitable computing system environment in which embodiments of the natural interactions academic course designer system 100 and method shown in FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment.

Embodiments of the natural interactions academic course designer system 100 and method are operational with numerous other general purpose or special purpose computing system environments or configurations. Examples of well known computing systems, environments, and/or configurations that may be suitable for use with embodiments of the natural interactions academic course designer system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the natural interactions academic course designer system 100 and method may be described in the general context of computer-executable instructions, such as program modules, being executed by a computer. Generally, program modules include routines, programs, objects, components, data structures, etc., that perform particular tasks or implement particular abstract data types. Embodiments of the natural interactions academic course designer system 100 and method may also be practiced in distributed computing environments where tasks are performed by remote processing devices that are linked through a communications network. In a distributed computing environment, program modules may be located in both local and remote computer storage media including memory storage devices. With reference to FIG. 5, an exemplary system for embodiments of the natural interactions academic course designer system 100 and method includes a general-purpose computing device in the form of a computer 510.

Components of the computer 510 may include, but are not limited to, a processing unit 520 (such as a central processing unit, CPU), a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer readable media. Computer readable media can be any available media that can be accessed by the computer 510 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 510. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within the computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information (or data) into the computer 510 through input devices such as a keyboard 562, pointing device 561, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 520 through a user input interface 560 that is coupled to the system bus 521, but may be connected by other interface and bus structures, such as, for example, a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a computing device having a processor for designing an academic course, comprising:
   using the computing device having the processor to perform the following:
   selecting a natural interaction forum;
   attaching a rubric to the selected natural interaction forum, wherein the rubric is a template used for assessing the learner's knowledge of the topic;
   assigning to the learner a natural interaction assignment in the selected natural interaction forum to assess the learner's knowledge of the topic;
   creating tags for the learner's posts in the natural interaction forum that matches information in the learner's posts to topics in the rubric;
   assessing the learner's knowledge of the topic with the natural interaction assignment to generate assessment results based at least in part on the created tags for the learner's posts; and
   computing a final score of the learner on the natural interaction assignment from the assessment results.

2. The method of claim 1, further comprising provisioning the selected natural interaction forum to those learners that have been assigned the natural interaction assignment.

3. The method of claim 2, further comprising:
   limiting participation in the selected natural interaction forum to those learners who are enrolled in the academic course and who have been given the natural interaction assignment; and
   creating a list of participants in the selected natural interactions forum to be assessed.

4. The method of claim 2, further comprising creating a list of learners to assess, wherein the list includes those learners who are enrolled in the academic course and who have been given the natural interaction assignment.

5. The method of claim 1, further comprising using at least one of a participation metric, or a tagging metric, or a natural language metric to assess the learner and generate the assessment results.

6. The method of claim 5, further comprising:
   computing a single score from the assessment results; and
   normalizing the single score to obtain the final score of the learner on the natural interaction assignment.

7. The method of claim 1, further comprising overlaying statistical data on the natural interaction forum to measure a participation of the learner in the natural interaction forum to obtain participation numerical data.

8. The method of claim 7, further comprising:
   creating a communication network visualization that graphically visualizes a communication network of the natural interaction forum; and
   displaying the communication network visualization.

9. The method of claim 1, further comprising accumulating each of the tags associated with the learner to define the tagging metric for the learner.

10. The method of claim 1, further comprising:
using a natural language technique to examine the learner's posts in the natural interaction forum for specific topics and keywords contained in the rubric; and
defining results of the examination with the natural language technique as the natural language metric.

11. A method implemented on a computing device having a processor for determining a learner's final grade in an academic course, comprising:
using the computing device having the processor to perform the following:
selecting a type of natural interaction forum to assess a learner's knowledge of subject matter;
attaching a rubric to the selected natural interaction forum, the rubric being used as a benchmark for assessing the learner's knowledge;
assigning to the learner a natural interaction assignment that uses the selected natural interaction forum;
assessing the learner's knowledge based on the learner's posts in the selected natural interaction forum using a participation metric that measures both statistically and visually a participation of the learner in the natural interactions forum to generate assessment results for the learner;
computing a single score from the assessment results corresponding to the learner's grade on the natural interaction assignment;
integrating the learner's grade on the natural interaction assignment into a formal gradebook; and
producing a final grade for the learner based at least on the learner's grade on the natural interaction assignment.

12. The method of claim 11, further comprising:
provisioning the selected natural interaction forum by using a security model to allow participation in the selected natural interaction forum only by those learners who are enrolled in the academic course and who have been given the natural interaction assignment; and
creating a list of learners in the academic course to assess from participants in the selected natural interaction forum.

13. The method of claim 11, further comprising creating a list of learners in the academic class to assess, wherein the list includes only those learners who are enrolled in the academic course and who have been given the natural interaction assignment.

14. The method of claim 11, further comprising:
overlaying statistical data on the selected natural interaction forum that measures the learner's participation in the selected natural interaction forum to obtain participation numerical data;
creating a communication network visualization that graphically illustrates a communication network of the selected natural interaction forum; and
combining the participation numerical data and the communication network visualization to obtain a participation metric.

15. The method of claim 11, further comprising:
tagging a learner's posts in the selected natural interaction forum with tags that match information in the learner's posts to topics in the rubric;
accumulating each of the tags associated with the learner to define a tagging metric; and
assessing the learner's knowledge using the tagging metric.

16. The method of claim 11, further comprising:
using a natural language processing technique to examine learner's post in the selected natural interaction forum for specific topics and keywords that are contained in the rubric;
defining results of examination using the natural language processing technique as a natural language processing metric; and
assessing the learner's knowledge using the natural language processing metric.

17. A computer-implemented method for integrating a natural interaction forum into a formal curriculum for an academic course, comprising:
selecting a natural interaction forum to use in an assessment of a learner's knowledge of subject matter taught in the academic course;
attaching a rubric to the selected natural interaction forum, wherein the rubric is a benchmark to assess a learner's posts in the selected natural interaction forum;
assigning to the learner a natural interaction assignment that uses the natural interaction forum;
provisioning the selected natural interaction forum to the learner and other participants;
seeding the natural interaction forum with a topic for discussion by participants in the selected natural interaction forum;
assessing the learner's knowledge of the topic to generate assessment results by using any combination of one or more of a participation metric, a tagging metric, and a natural language processing metric;
creating a communication network visualization that graphically visualizes a communication network of the selected natural interaction forum;
displaying the communication network visualization;
computing a single score corresponding to the learner's grade on the natural interaction assignment using the assessment results; and
integrating the learner's grade on the natural interaction assignment into a formal gradebook.

18. The computer-implemented method of claim 17, further comprising assessing a learner's knowledge of the topic using the participation metric that includes statistical data corresponding to any combination of a number of times the learner started a thread, a number of times the learner ended a thread, a number of times the learner had another participant in the selected natural interaction forum respond to the learner's post, a number of times the learner responded to another participant's post, and a complexity of the learner's post.

19. A method implemented on a computing device having a processor, comprising:
using the computing device having the processor to perform the following:
selecting a natural interaction forum;
attaching a rubric to the selected natural interaction forum, wherein the rubric is a template used for assessing the learner's knowledge of the topic;
assigning to the learner a natural interaction assignment in the selected natural interaction forum to assess the learner's knowledge of the topic;

assessing the learner's knowledge of the topic with the natural interaction assignment to generate assessment results based at least in part on the attached rubric, wherein assessing the learner's knowledge includes using at least one of a participation metric, or a tagging metric, or a natural language metric to assess the learner and generate the assessment results; and computing a final score of the learner on the natural interaction assignment from the assessment results, wherein computing the final score includes computing a single score from the assessment results and normalizing the single score to obtain the final score of the learner on the natural interaction assignment.

20. The method of claim 19, further comprising provisioning the selected natural interaction forum to those learners that have been assigned the natural interaction assignment.

21. The method of claim 19, further comprising overlaying statistical data on the natural interaction forum to measure a participation of the learner in the natural interaction forum to obtain participation numerical data.

22. The method of claim 21, further comprising:

creating a communication network visualization that graphically visualizes a communication network of the natural interaction forum; and displaying the communication network visualization.

23. The method of claim 19, further comprising creating tags for the learner's posts in the natural interaction forum that matches information in the learner's posts to topics in the rubric.

24. The method of claim 23, further comprising accumulating each of the tags associated with the learner to define the tagging metric for the learner.

25. The method of claim 19, further comprising:

using a natural language technique to examine a learner's post in the natural interaction forum for specific topics and keywords contained in the rubric; and defining results of the examination with the natural language technique as the natural language metric.

* * * * *